United States Patent
Fanucci et al.

(10) Patent No.: US 8,182,643 B2
(45) Date of Patent: May 22, 2012

(54) LARGE COMPOSITE STRUCTURES AND A PROCESS FOR FABRICATING LARGE COMPOSITE STRUCTURES

(75) Inventors: Jerome P. Fanucci, Lexington, MA (US); Michael McAleenan, Georgetown, ME (US)

(73) Assignee: KaZaK Composites, Incorporated, Woburn, MA (US)

( * ) Notice: Subject to any disclaimer, the term of this patent is extended or adjusted under 35 U.S.C. 154(b) by 1307 days.

(21) Appl. No.: 10/738,503

(22) Filed: Dec. 17, 2003

(65) Prior Publication Data

US 2004/0211151 A1  Oct. 28, 2004

Related U.S. Application Data

(60) Provisional application No. 60/434,131, filed on Dec. 17, 2002.

(51) Int. Cl.
*B29C 65/56* (2006.01)

(52) U.S. Cl. ............... 156/304.5; 156/242; 156/244.11; 156/244.17; 156/244.13; 156/244.15; 156/304.1; 156/304.3; 114/65 R; 114/76; 114/77; 114/85; 264/145; 264/148; 264/152

(58) Field of Classification Search .......... 156/242, 156/244.17, 243, 244.11, 244.13, 244.15, 156/304.1, 304.3, 304.5; 52/266, 79.1, 79.12, 52/234, 236, 236.6, 236.9, 236.7, 261, 262; 114/65 R, 76, 77, 85, 357; 264/145, 148, 264/152

See application file for complete search history.

(56) References Cited

U.S. PATENT DOCUMENTS

| | | | |
|---|---|---|---|
| 4,258,520 A | 3/1981 | Rehbein | |
| 4,557,091 A * | 12/1985 | Auer | 52/282.3 |
| 5,066,349 A | 11/1991 | Perko et al. | |
| 5,403,062 A | 4/1995 | Sjostedt et al. | |
| 5,617,689 A * | 4/1997 | Beane | 52/489.1 |
| 5,678,715 A * | 10/1997 | Sjostedt et al. | 220/1.5 |
| 5,756,179 A | 5/1998 | Jute | |
| 5,758,461 A * | 6/1998 | McManus | 52/293.3 |
| 6,161,349 A * | 12/2000 | Carr | 52/270 |
| 6,207,256 B1* | 3/2001 | Tashiro | 428/178 |
| 6,286,281 B1 | 9/2001 | Johnson | |
| 2003/0024189 A1* | 2/2003 | Hughes et al. | 52/271 |
| 2004/0003885 A9* | 1/2004 | Johnson et al. | 156/148 |
| 2007/0193144 A1* | 8/2007 | Crowell | 52/262 |

FOREIGN PATENT DOCUMENTS

| | | |
|---|---|---|
| GB | 2 048 174 A | 5/1979 |
| JP | 48058623 | 8/1973 |
| JP | 49039451 | 10/1974 |
| JP | 51078019 | 6/1976 |
| JP | 56130514 | 10/1981 |
| JP | 10231609 | 9/1988 |
| JP | 03021433 | 1/1991 |

(Continued)

*Primary Examiner* — Christopher Schatz
(74) *Attorney, Agent, or Firm* — Weingarten, Schurgin, Gagnebin & Lebovici LLP

(57) ABSTRACT

In a process for fabricating large structures, a composite material panel is continuously pultruded in a pultrusion die assembly and cut transversely to the process direction to provide panel sections. The panel sections can be sufficiently long to extend from one end to an opposite end of the structure. The panel sections are assembled with a joint along adjacent edges using steel-to-composite and composite-to-composite joining technology. The joints can be integrated into the panel longitudinal edges, or separate joint assemblies can be fabricated. In this manner, fewer joints are required. A variety of in-plane and out-of-plane joint assemblies are provided.

21 Claims, 21 Drawing Sheets

FOREIGN PATENT DOCUMENTS

| | | |
|---|---|---|
| JP | 04034325 | 3/1992 |
| JP | 5034212 | 5/1993 |
| JP | 10292553 | 11/1998 |
| JP | 11141048 | 5/1999 |
| JP | 2001213386 | 8/2001 |
| JP | 2002004088 | 1/2002 |

* cited by examiner

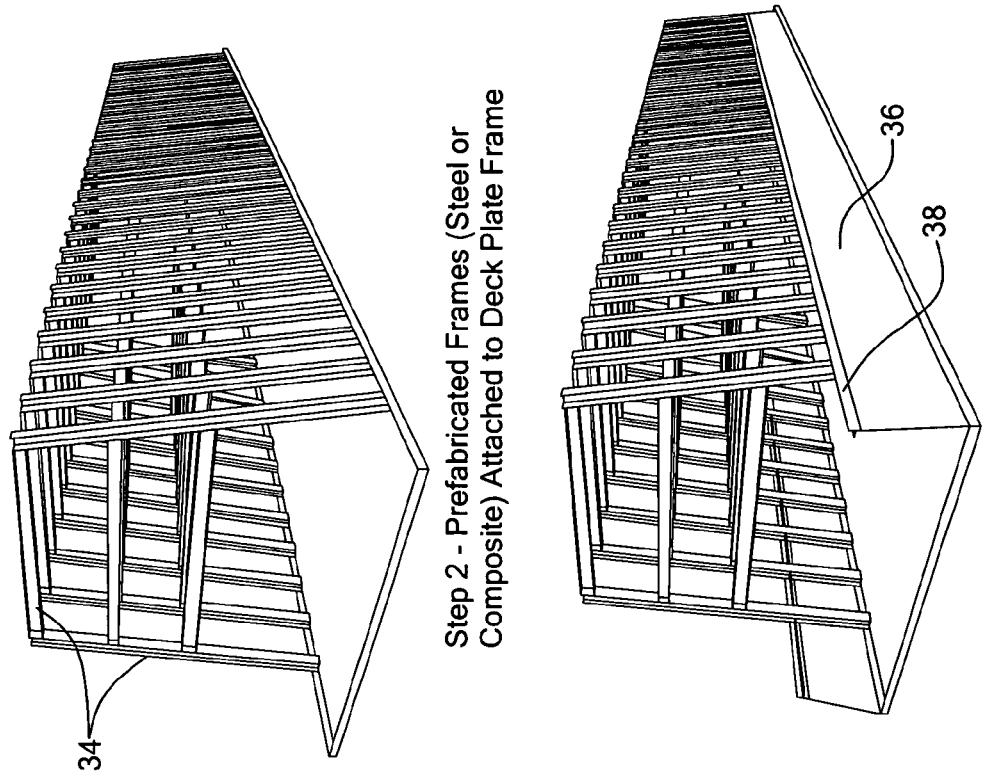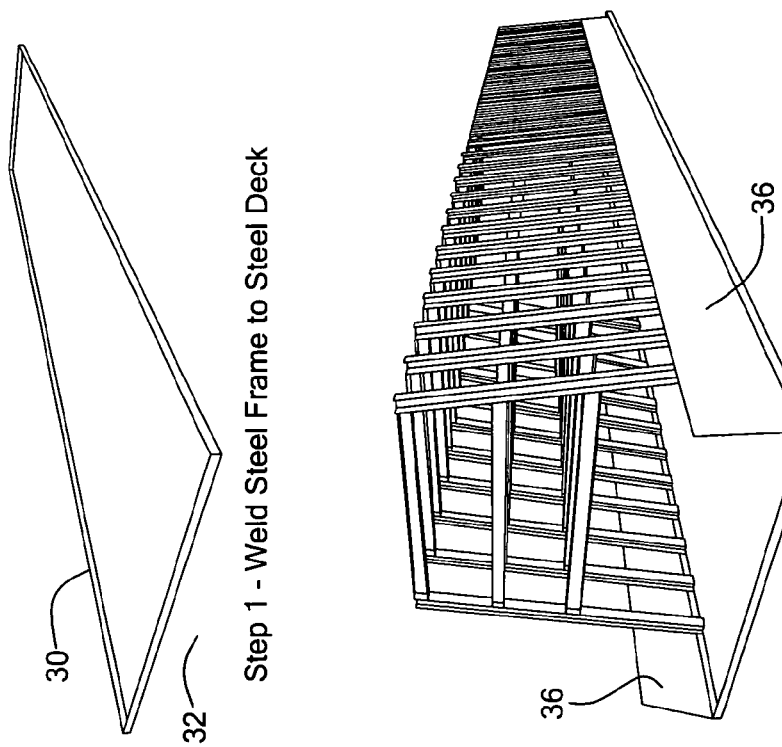
FIG. 3A

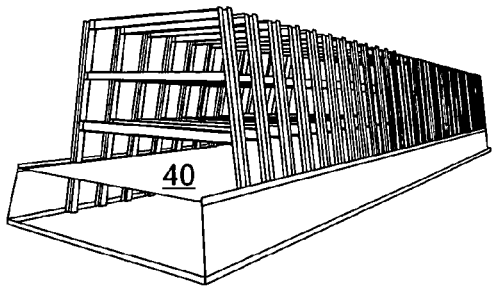

Step 5 - 10' x 300' Pultruded Deck Panels Slid Between Deck Beams (centerline panel will be different width and different edge detail)

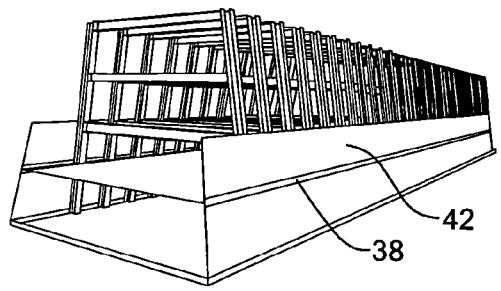

Step 6 - Add Second Level 10' x 300' Pultruded Composite Panels, Bonding Lower Edge into Composite Joint Detail

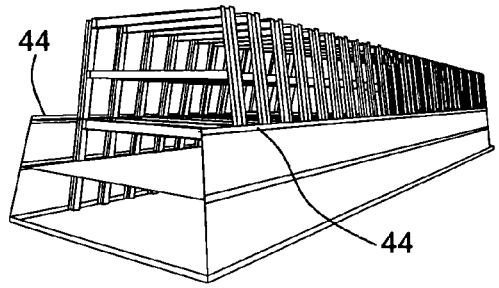

Step 7 - Bond Second Level Connector

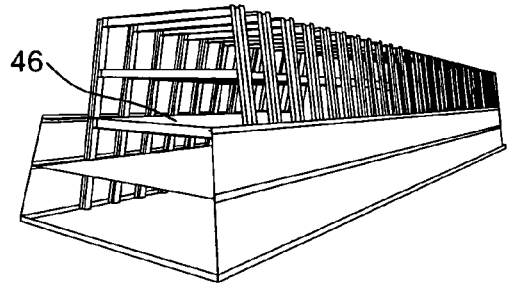

Step 8 - Slide Second Level Pultruded Deck

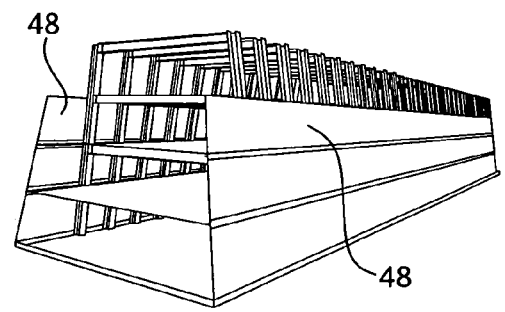

Step 9 - Add Third Level of Continuous Length Pultruded Panels

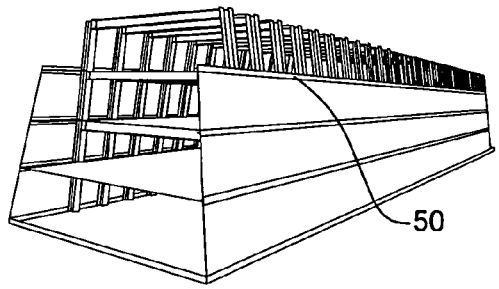

Step 10 - Add Last Panel to Panel Connection Pultrusion

FIG. 3B

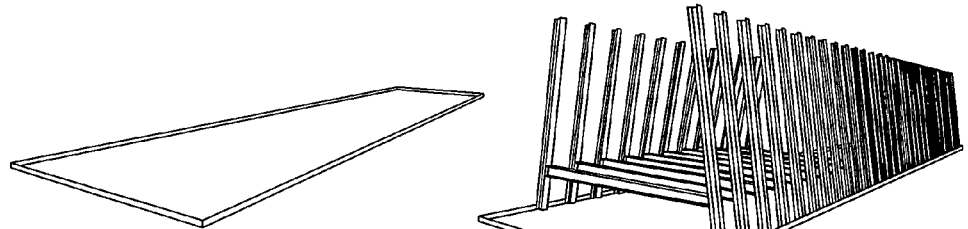
Step 1 - Weld Steel Frame to Steel Deck
Step 2 - Prefabricated Frames with Only Lower Deck Beam Erected
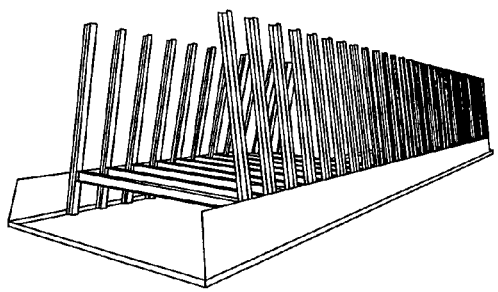
Step 3 - First 10' x 300' Long Composite Side Panels Bolted and/or Bonded to Steel Base Frame
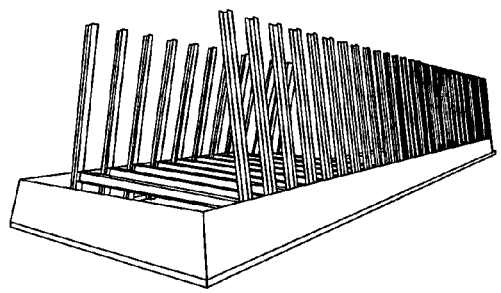
Step 4 - 10' x 50' Long Pultruded End Walls Added
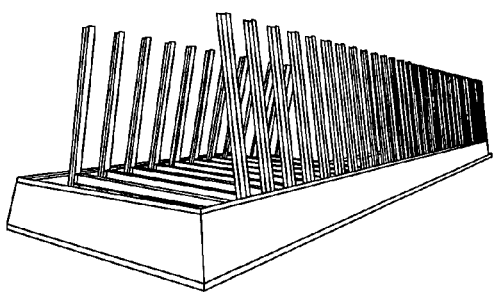
Step 5 - Add Connector Pltrusions
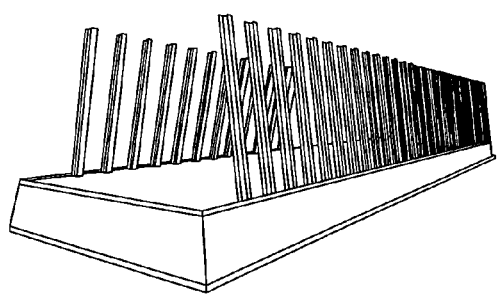
Step 6 - Add First Level Deck
*FIG. 4A*

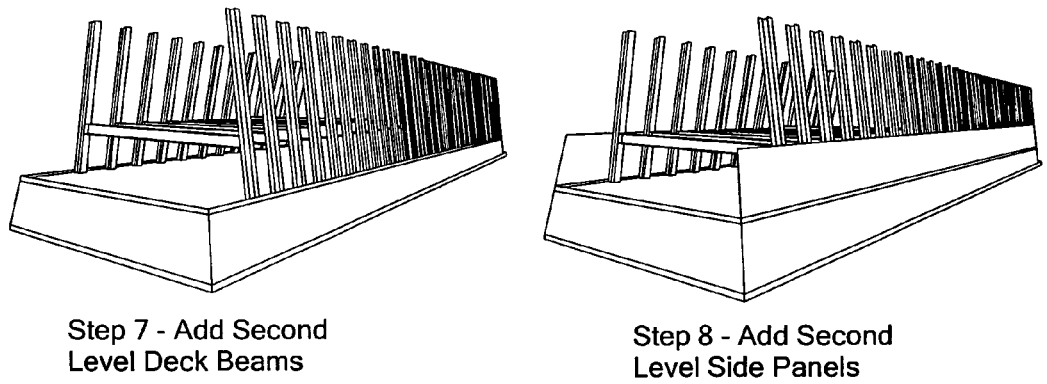
Step 7 - Add Second
Level Deck Beams
Step 8 - Add Second
Level Side Panels
FIG. 4B
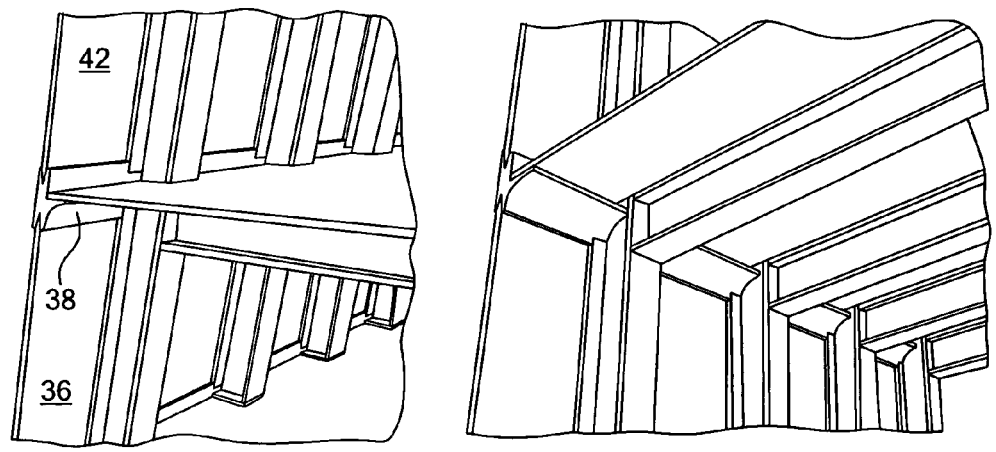
FIG. 5A  FIG. 5B

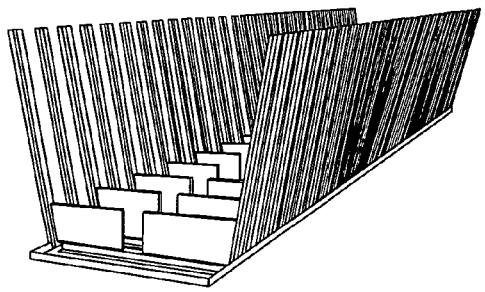
Step 5 - Assemble Top Deck Space Bulkheads in Proper Positions
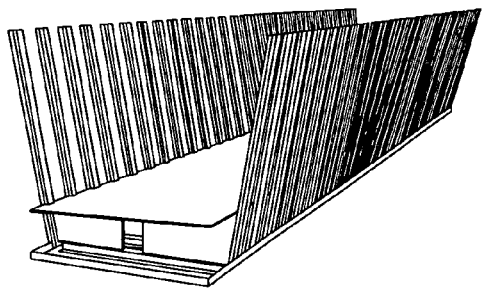
Step 6 - Lay Out Top Deck Onto Bulkhead Edges and Frame Tabs
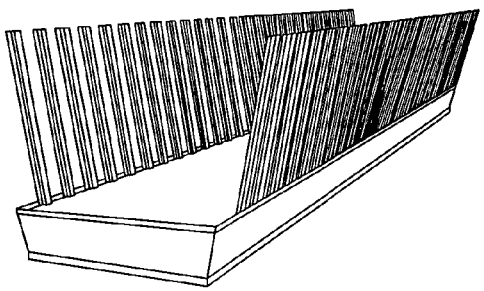
Step 7 - Add Top Deck Space Perimeter Bulkheads and Interdeck Joints
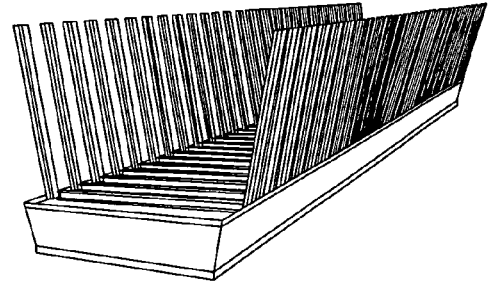
Step 8 - Add Top Deck Supporting Crossmember/Joists
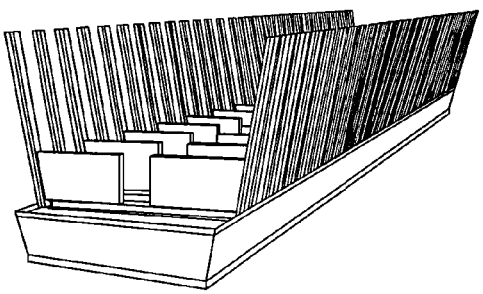
Step 9 - Add Third Deck Space Bulkheads
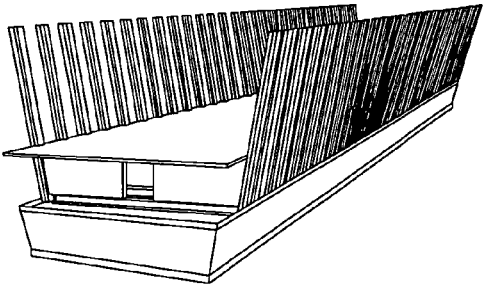
Step 10 - Add Third Deck
FIG. 6B

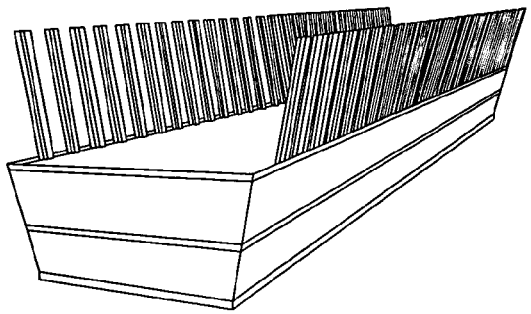
Step 11 - Add Third Deck Perimeter Bulkheads and Interdeck Joint
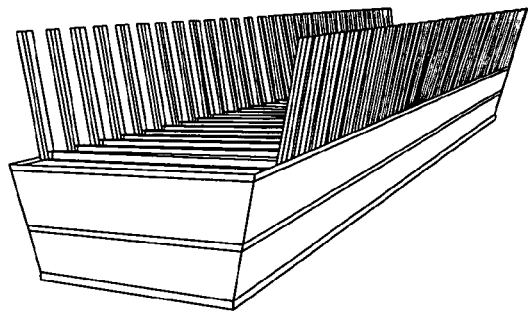
Step 12 - Add Third Deck Supporting Frame Crossmembers
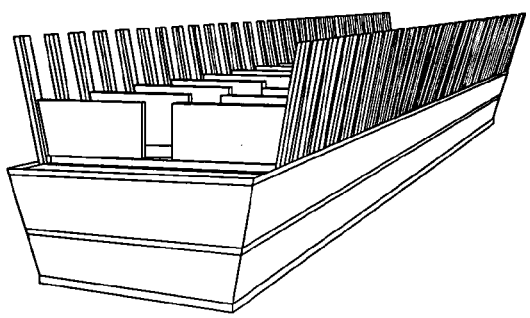
Step 13 - Add Second Deck Space Interior Bulkheads
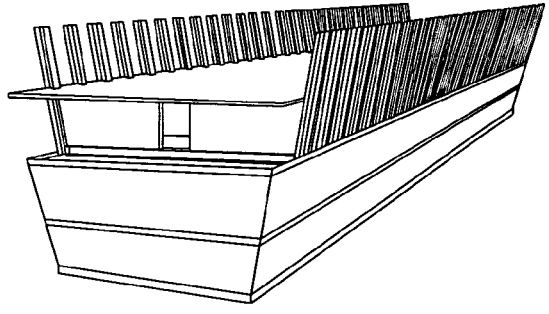
Step 14 - Add Second Deck
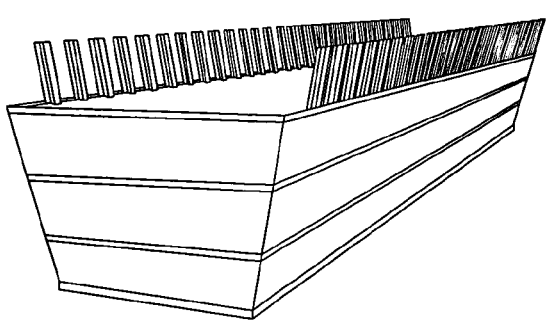
Step 15 - Add Second Deck Perimeter Bulkheads
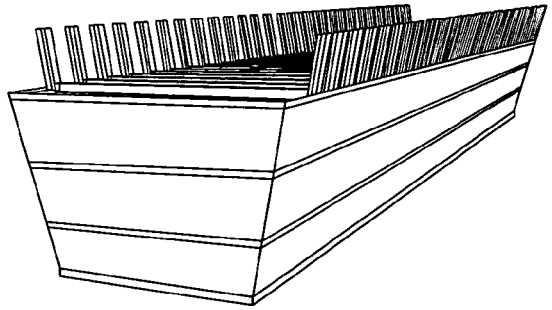
Step 16 - Add Second Deck Supporting Frame Crossmembers
*FIG. 6C*

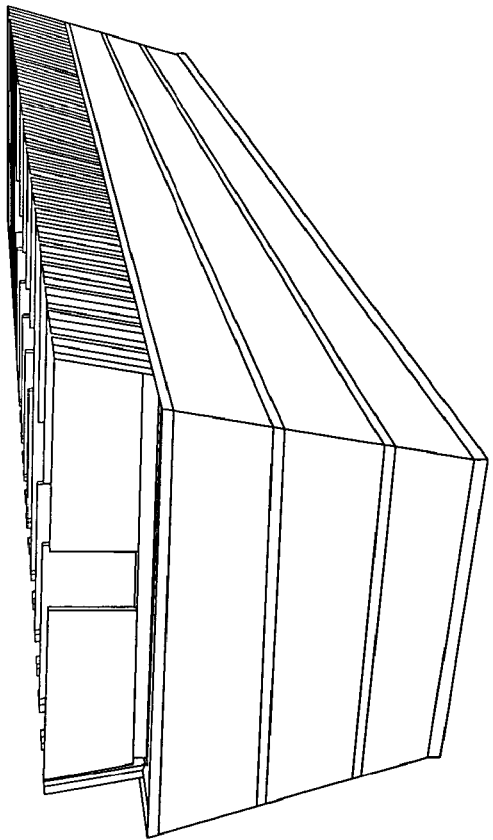
Step 17 - Add First Deck Space Interior Bulkheads
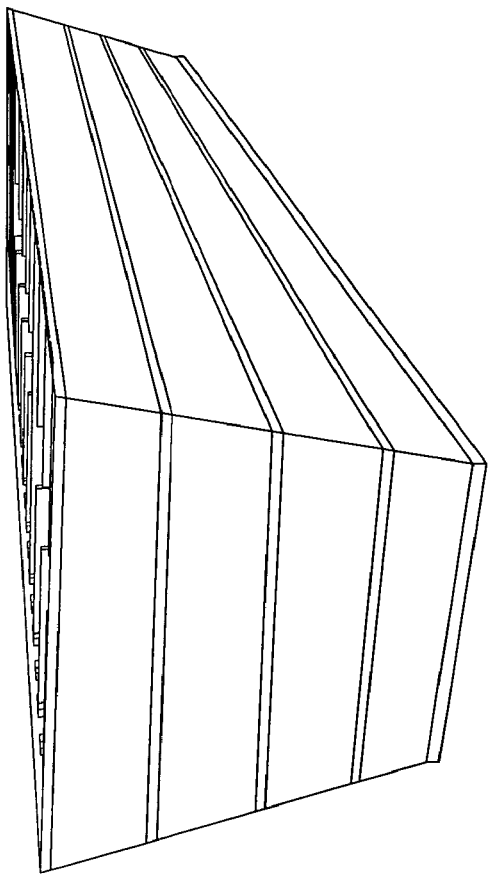
Step 18 - Add First Deck Perimeter Bulkheads and Main Deck Joint Piece
*FIG. 6D*

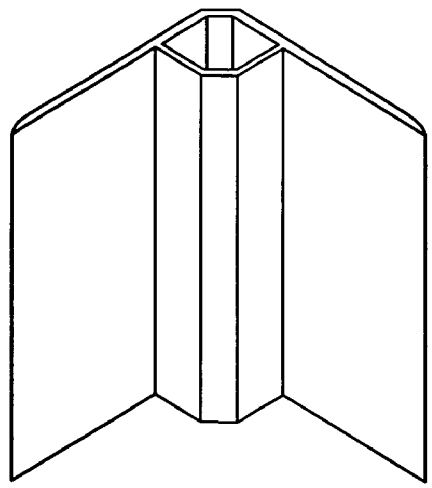
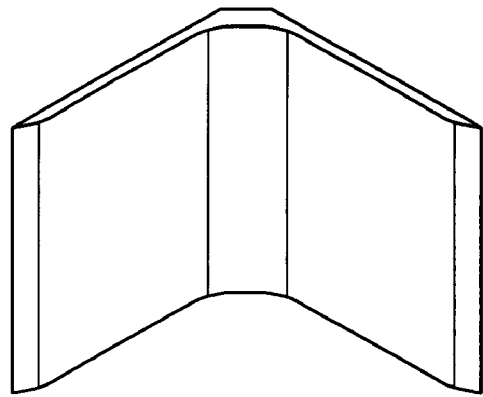
FIG. 19  FIG. 20
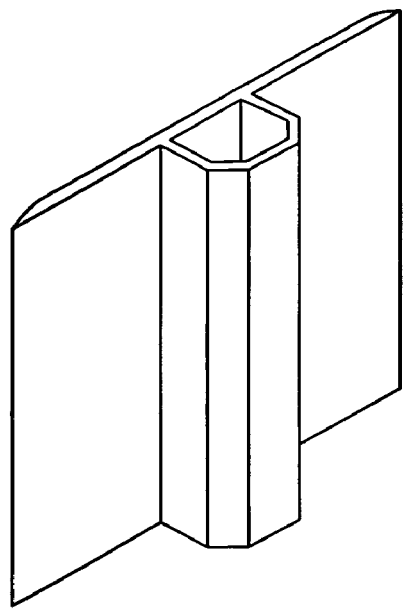
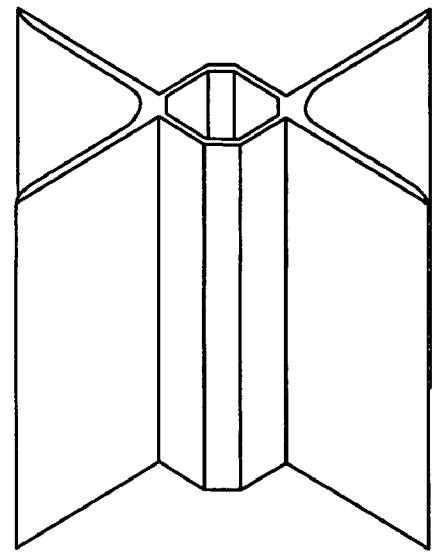
FIG. 21  FIG. 22

LARGE COMPOSITE STRUCTURES AND A PROCESS FOR FABRICATING LARGE COMPOSITE STRUCTURES

CROSS REFERENCE TO RELATED APPLICATIONS

Benefit under 35 U.S.C. §119(e) is claimed of U.S. Provisional Application No. 60/434,131, filed Dec. 17, 2002, the disclosure of which is incorporated by reference herein.

STATEMENT REGARDING FEDERALLY SPONSORED RESEARCH OR DEVELOPMENT

The invention was made with Government support under SBIR Grant Contract #N00014-02-M-0086. The Government has certain rights in the invention.

BACKGROUND OF THE INVENTION

In certain applications, large scale structures such as buildings and ships are fabricated from steel, a traditional structural material. Similarly, a deckhouse on a ship may be fabricated in a shipyard from steel panels. In such structures, a single wall, floor, or ceiling of the building may be formed from a number of steel panels welded together. The entire structure is further welded to the steel deck of the ship.

Compared to steel, composite materials are much lighter in weight and exhibit good corrosion resistance. Composite materials are formed of reinforcing fibers within a resin matrix. Parts fabricated from composite materials can be made strong and stiff and can be used to advantage in structural applications. However, parts fabricated from composite materials are often more costly than steel parts. The higher cost is generally due to the greater cost of the raw materials coupled with greater tooling and labor costs. Also, composite elements are more complex to join than steel plate and frame structures, which are typically joined relatively simply by welding. Thus, the composite materials may not be used to replace steel, even if their benefits would be advantageous in a particular application, due to cost considerations.

The vacuum assisted resin transfer method (VARTM) is a batch process that can be used to form composite materials into complex three-dimensional shapes. This method requires the fabrication of a mold in the final form of the part to the manufactured. The raw material is cut into appropriately sized pieces and laid up in layers in the mold. The distribution media, hoses, vacuum lines and resin lines are set. Then the resin is injected and allowed to cure. The part is then unbagged and demolded. The support materials must then be disposed of and the mold cleaned, and the entire process repeated for the next part. This process is costly due to the higher raw material costs, the hand labor required, single part processing, long cure cycle, and the amount of scrap material generated. Thus, the cost per pound of VARTM composites is high compared to steel fabrication.

Pultrusion is another known fabrication process for forming composite material parts. Pultrusion is generally more suitable for forming two-dimensional shapes. The initial tooling costs can be high, but pultrusion is a continuous process from which many parts can be formed relatively economically with less labor than VARTM. Thus, in certain applications, pultrusion can be more advantageous than VARTM.

Both VARTM and pultrusion are not yet as cost efficient as steel fabrication, however. Thus, a composite material fabrication process that is competitive with steel fabrication for large scale structures would be beneficial.

SUMMARY OF THE INVENTION

The present invention relates to a process for fabricating large structures and to the structures formed by this process. The structures are formed from a plurality of large pultruded structural panels. Composite-to-composite and steel-to-composite joint designs for the edges of the panels are provided for assembling the panels into a structure.

More particularly, a continuous composite material panel is pultruded in a pultrusion die assembly. The continuous panel has opposed longitudinal edges extending in the process direction. After exiting the pultrusion die assembly, the continuous panel is cut transversely to the process direction into panel sections of the desired length for the particular structure. The panel sections are assembled into the desired structure by joining two or more panel sections with a joint along adjacent edges. The joint may be formed by edge details integrated into the panel's longitudinal edges during the pultrusion process and/or by a separate joint assembly that interconnects the adjacent panels along their edges. At least some of the panels may be assembled to extend from one end to an opposite end of the structure. Thus, with the present invention, the number of joints required in the structure as a whole can be minimized.

Thus, the invention provides a cost- and performance-effective alternative to welded steel construction. The steel-to-composite and composite-to-composite joint designs for both in-plane (bulkhead, deck) and out-of-place (deck to bulkhead, bulkhead to bulkhead) panel joints have self-fixturing attributes and high unit load capacities. More structural applications can take advantage of the reduced weight, corrosion resistance and tailored performance benefits of composite materials using the present invention.

DESCRIPTION OF THE DRAWINGS

The invention will be more fully understood from the following detailed description taken in conjunction with the accompanying drawings in which:

FIG. 3A is a schematic illustration of steps in a process of assembling a structure according to the present invention;

FIG. 3B is a schematic illustration of further steps in the process of FIG. 3A;

FIG. 4A is a schematic illustration of steps in an alternative process of assembling a structure according to the present invention;

FIG. 4B is a schematic illustration of further steps in the process of FIG. 4A;

FIG. 5A is a schematic isometric view of a joint detail for the structure of FIGS. 3A-4B;

FIG. 5B is a further schematic isometric view of a joint detail for the structure of FIGS. 3A-4B;

FIG. 6B is a schematic illustration of further steps in the process of FIG. 6A;

FIG. 6C is a schematic illustration of further steps in the process of FIGS. 6A and 6B;

FIG. 6D is a schematic illustration of further steps in the process of FIGS. 6A-6C;

FIGS. 19-25 are further embodiments of joint assemblies according to the present invention;

DETAILED DESCRIPTION OF THE INVENTION

Figure 1:
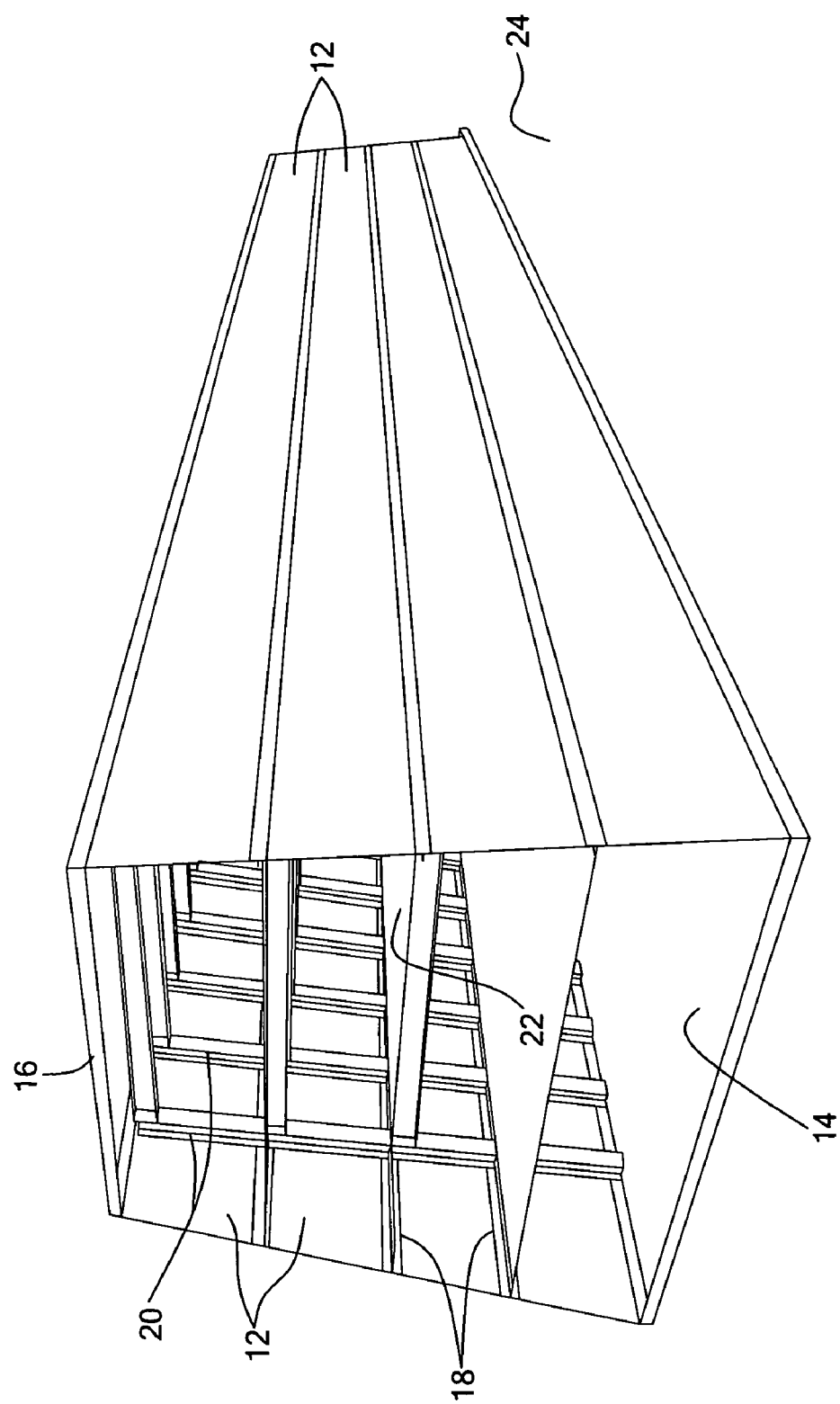
FIG. 1 is an isometric schematic view of a building structure according to the present invention.

FIG. 1 illustrates a multi-level structure, such as a deckhouse for a ship, that can be taken as an example of the present invention. Such a structure 10 may include perimeter walls 12, a bottom floor or deck 14, a roof deck 16, and intermediate decks or flooring 18. The structure may be framed with vertical framing elements 20 spaced periodically along its length and horizontal or transverse cross beams 22 at the level of each deck. The structure's outer or perimeter walls may be vertical or tapered somewhat from vertical, as illustrated, depending on the application.

Such a structure may require a variety of in-plane and out-of-plane joint assemblies to attach all of the various panel sections together to arrive at the desired final structure configuration. For example, the perimeter walls of adjacent levels are attached together with in-plane joints. The perimeter walls are attached to the horizontal deck and ceiling panel sections with out-of-plane joints. Interior walls or bulkheads may require a variety of corner joint assembly configurations, depending on the structure's design. Such a structure may also need to be attached to a preexisting foundational surface, such as a steel deck 24.

Figure 2:
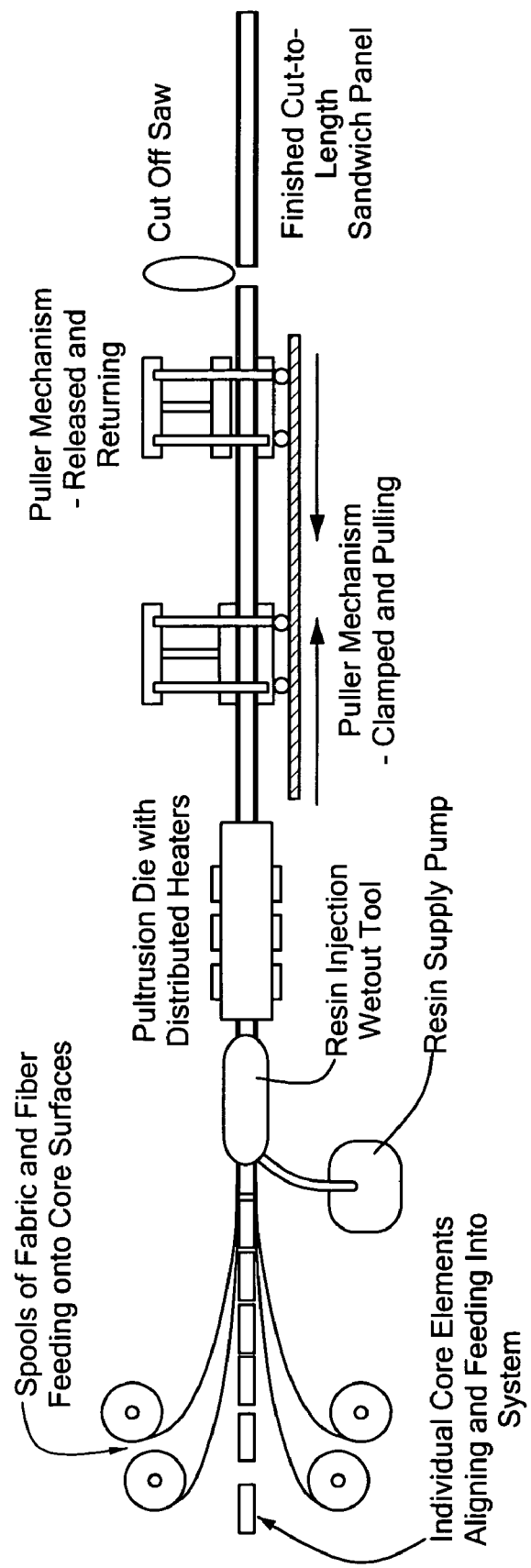
FIG. 2 is a schematic illustration of a pultrusion process for use in the present invention.

The composite material panels and joint assemblies are formed using a pultrusion process, illustrated schematically in FIG. 2. The pultrusion process generally is known and will not be described in detail herein. Composite materials are typically formed from glass or carbon fibers and polyester, vinyl ester, epoxy, or polyurethane resins, although other materials can be used. The composite material panels can be of any suitable type. They can be sandwich panels with a suitable core material, such as balsa, foam, honeycomb, stitched cores, or fabric-reinforced cores. The panels can be solid laminates without a core, rib-stiffened or blade-stiffed panels, or cellular core panels.

According to the present invention, the pultrusion equipment is preferably located at the site where the structure is to be constructed. On-site fabrication eliminates the need to ship the panels by truck, rail, or barge, which would minimize the size of the panels. For example, panels transported by truck can generally be no longer than 53 feet, and panels transported by rail can generally be no longer than 80 feet. Barged panels can be somewhat longer, but the panel length is still constrained by the barge's capacity. When the pultrusion equipment is located at the construction site, the length of a pultruded panel is essentially unlimited. Portions of a pultruded panels can be cut off to form a panel section of any desired length. Preferably, the panel sections are at least four feet in width and the length in the process direction is at least twice as long as the width. The panels can readily be formed with greater widths, such as eight feet, ten feet, or more. The length of the panel exiting the pultrusion die assembly is essentially unlimited. The panel is cut across the length to form the panel sections of any desired length, such as twenty feet, forty feet, one hundred feet, or more. Panel sections can be several hundred feet long.

The panel sections are assembled into a structure with a joint along adjacent longitudinal edges of the panel sections. The panel can be continuously pultruded with each longitudinal edge in the process direction having joint details integrated therein. Alternatively, a separate joint assembly can be fabricated and used to join two panel sections along adjacent longitudinal edges. The separate joint assembly may be fabricated as a continuous pultrusion that is, like the panel, cut to any desired length. A number of joint details are described with more particularity below. Preferably, at least a portion of the panel sections are assembled to extend from one end to an opposite end of the structure. See, for example, panel sections 12 in FIG. 1. In this manner, the number of joints in the structure can be minimized.

Figure 3C:
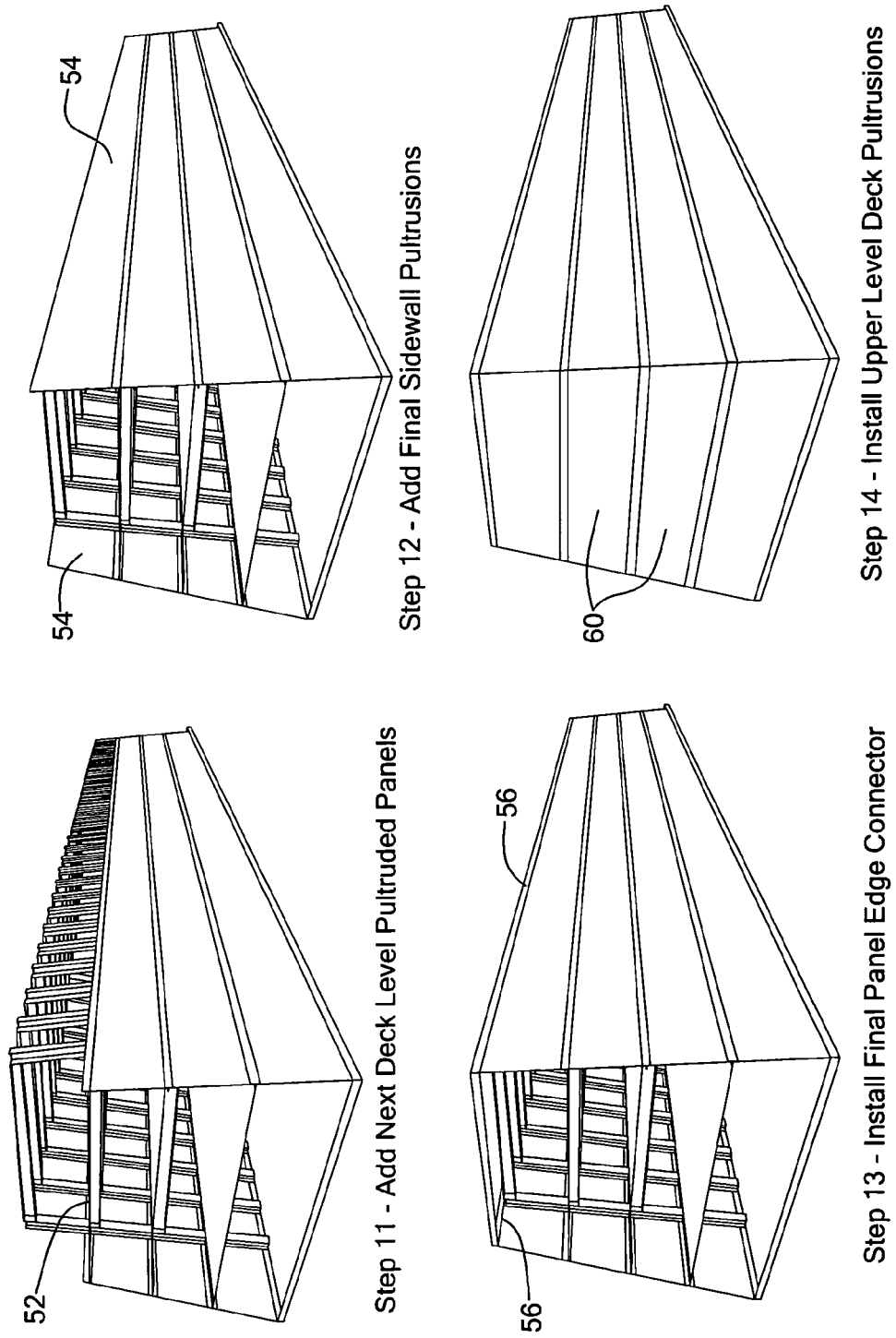
FIG. 3C is a schematic illustration of further steps in the process of FIGS. 3A and 3B.
Figure 6A:
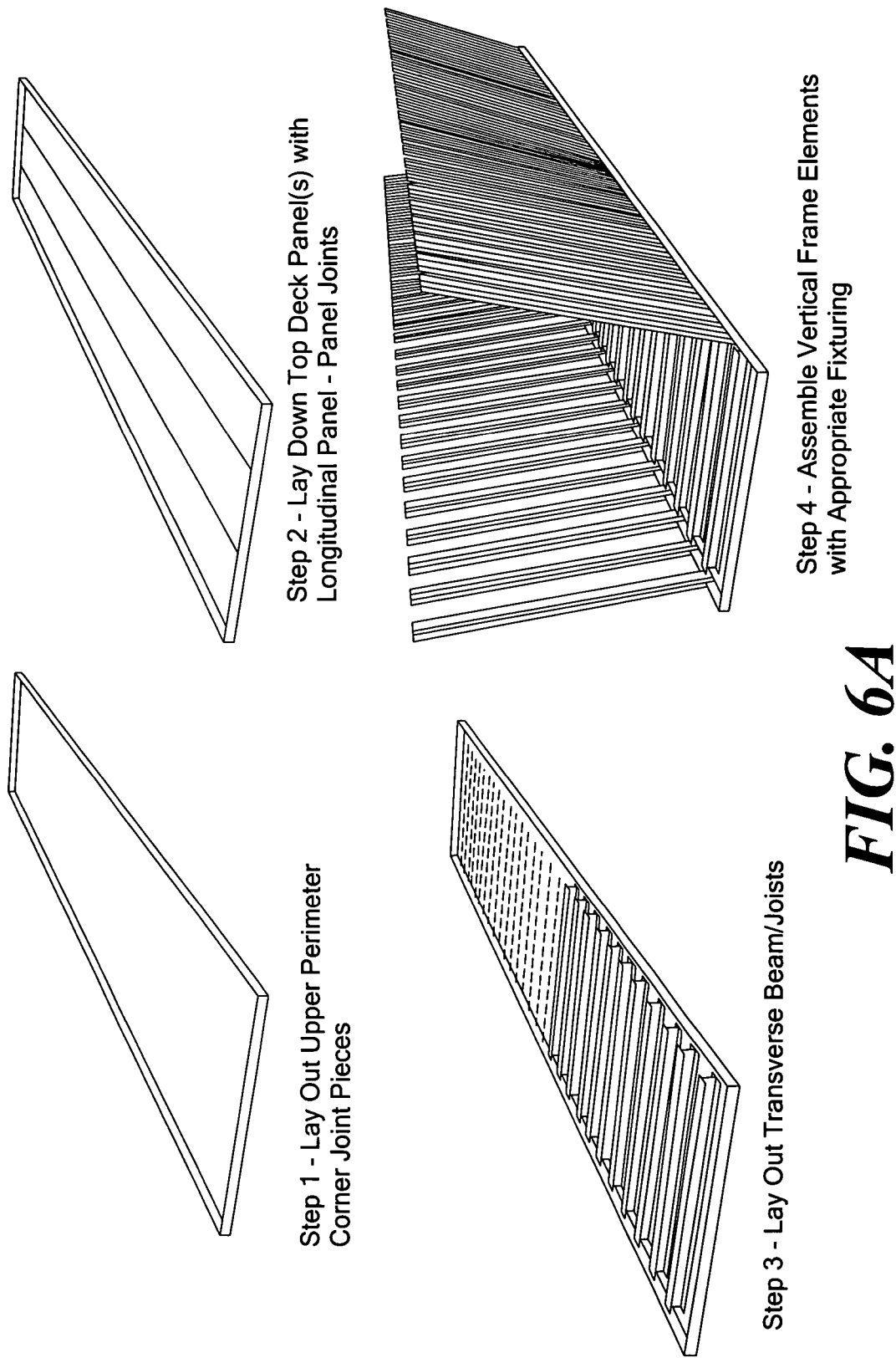
FIG. 6A is a schematic illustration of steps in a still further process of assembling a structure according to the present invention.

One embodiment of an assembly process for a structure is illustrated in FIGS. 3A-3C. The structure shown has four levels, although any desired number of levels could be provided. Similarly, the structure shown has tapered walls, although the walls could be vertical if desired. Also, in the process shown, the structure is assembled on a foundation surface, such as a steel deck. The structure can be, for example, several hundred feet long.

In the first step, a steel frame 30 outlining the perimeter of the enclosure is welded to the steel deck 32. The steel frame includes a joint assembly between the horizontal steel deck and the vertical composite perimeter panels, described further below. In step 2, wall, floor, and ceiling frame members 34, either composite or steel, are attached to the deck plate frame. Next, a first level of long pultruded composite perimeter panel sections 36 are attached in any suitable manner, such as with mechanical fasteners or adhesive bonding or both, to the vertical frame members. Then, long pultruded joint assemblies 38 are attached to the upper edges of the long perimeter panel sections. Alternatively, the longitudinal lengths of the panel sections can be pultruded with the joint details integrated therein, eliminating the need for a separate joint assembly. The joint between two wall panel sections and a deck panel section is illustrated with more particularity in FIGS. 5A and 5B. In this example, the joint assembly is cut out to accommodate the vertical framing elements.

In step 5, a long pultruded deck panel section 40 is slid onto the deck beams 34. A plurality of long deck panel sections can be used, placed with the long edges adjacent, if the width of the floor is greater than the width of a pultruded deck panel section. Next, a second level of long pultruded composite perimeter panel sections 42 are attached to the joint assembly along the upper edge of the first level of perimeter panel sections, as by adhesive bonding, mechanical fastening, or both. Then, long joint assemblies 44 are attached to the upper edges of the long perimeter panel sections of the second level. In step 8, a long pultruded deck panel section (or panel sections) 46 is slid into place.

In step 9, a third level of continuous long pultruded composite perimeter panel sections 48 are attached to the joint assembles 44 along the upper edges of the second level of perimeter panel sections 42. Next, long joint assemblies 50 are attached to the upper edges of the third level of perimeter panel sections. The next deck panel section (or panel sections) 52 is slid into place. The final perimeter panel sections 54 are attached to the upper edges of the third level perimeter panel sections, and a final panel edge connector 56 is installed on the joint assembly along the top edge of the perimeter panel sections. The upper level deck panel section is then slid into place. End walls 60 are added at each end.

In another variation of the assembly process, illustrated in FIGS. 4A-4B, a base frame is welded to the steel deck and vertical frame members are installed as above. However, only the lowest level of transverse deck beams are installed in step 2. After installation of the first level of perimeter panel sections, a deck panel section can be dropped in vertically along the continuous length without interference from the pre-installed transverse deck beams for the upper level decks. The transverse deck beams are then installed following the installation of the deck panel sections for the level immediately below. This process avoids the need to slide the deck panel sections into place.

In a further alternative assembly process, the structure is assembled upside down, illustrated in FIGS. 6A-6D. In this process, the upper perimeter corner joint pieces are laid out. The top deck panel section is laid down. As above, several deck panel sections can be laid down with a longitudinal panel to panel joint therebetween if necessary. Then, transverse beams or joists are laid out. The vertical frame elements are assembled with appropriate fixturing. Top interior deck space bulkheads are assembled in their desired positions. In step 6, top deck panel sections are laid onto bulkhead edges and frame tabs. It will be appreciated that the interior bulkheads can be formed from pultruded panel sections and using the joint technology of the present invention.

Top deck space perimeter panel sections or bulkheads are attached to the upper perimeter joint pieces. Interdeck joints are attached to the edges of the perimeter panel sections in step 7. Top deck supporting cross members or joists and then third deck space bulkheads are added. Next, a third deck is added. In step 11, third deck perimeter panel sections or bulkheads and interdeck joints are added. Third deck supporting frame cross members are added. Second deck space interior bulkheads are placed in their desired locations, and a second deck is added. In step 15, second deck perimeter panels or bulkheads are added. Then, second deck supporting frame cross members are placed. In step 17, first deck space interior bulkheads are added. Next, the first deck perimeter panels and bulkheads are placed and the main deck joint piece added. Then, the entire assembled structure is turned over in place and fixed to the supporting deck.

A variety of joint assemblies suitable for use in structures such as described above are illustrated in FIGS. 7-27. The joint assemblies are illustrated as pieces separate from the panel sections. However, it will be appreciated that the joint details of these joint assemblies can be readily integrated into the longitudinal, or process direction, edges of the continuous panel during the pultrusion process. For ease of description, the joint details are described in conjunction with separate joint assemblies.

In the assembly of the structure, the elements of the joint assembly and the panel sections are fastened in any suitable manner, such as with a suitable bonding agent, such as epoxy, mechanical fasteners, or a combination of joining methods. Mechanical fasteners can suitably be used to provide integrity while the bonding agent is curing. Mechanical fastening can include fasteners such as bolts or screws, or can include devices that snap together or other interlocking elements integrally formed on corresponding portions of the joint to prevent removal once fitted together. By integrating interlocking elements into the joints, the joints can be self-fixturing.

Figure 7:
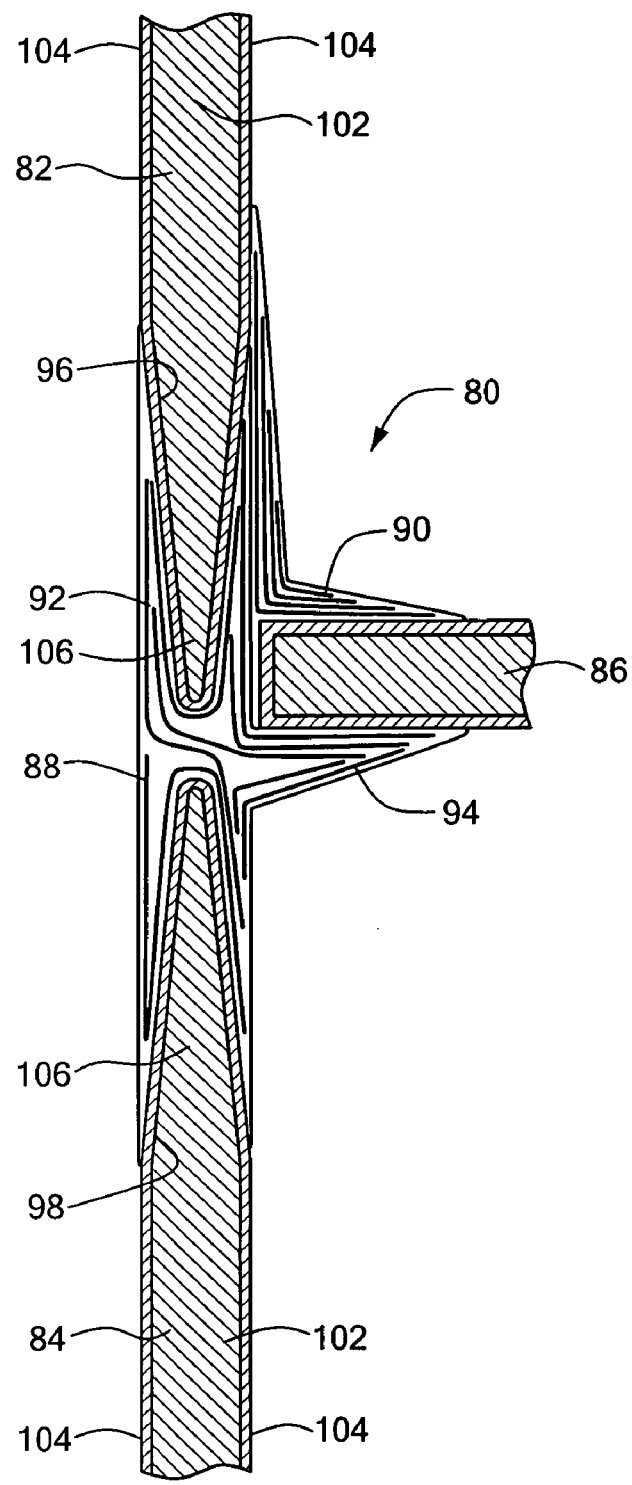
FIG. 7 is a schematic cross sectional view of a panel to panel to deck joint assembly according to the present invention.

A panel-to-panel-to-deck joint assembly 80 is illustrated in FIG. 7. This joint assembly joins two linearly aligned panel or plate-like structures 82, 84 with a third panel or plate-like structure 86, such as a deck, at an angle. In the embodiment illustrated, the joint assembly is formed in two pieces, a joint member 88 and an angle member 90. The joint member includes a lineal piece 92 and a ledge or flange 94. The lineal piece includes two recesses 96, 98 to receive the two panels 82, 84 that are linearly aligned. The angle member 90 sandwiches the edge of the third panel 86, such as a deck element, against the joint ledge or flange 94. The joint member and angle member are preferably pultruded to any length desired. In assembly, the deck panel is laid against the flange and the angle member placed against the deck panel. The colinear panels are inserted into the recesses. All the elements are suitably fastened. The joint assembly could be formed as one unitary piece with the angle piece integral with the joint member if desired. In this case, the deck panel is slid or otherwise inserted into the recess between the flange and the angle piece.

The three panel structures can be formed of a composite material or a metal such as steel. The joint assembly is particularly suitable for joining composite material panels to a steel deck or composite panel. In the embodiment illustrated, the panels 82, 84 are a sandwich type having a core 102 and face skins 104. The long edges 106 are tapered, and the face skins wrap around and cover the long edges. The tapered edge improves load transfer across the joint and can be readily formed in a composite material fabrication process. The deck element 86 is illustrated with a rectangular edge, although its edge could be tapered as well.

Figure 8:
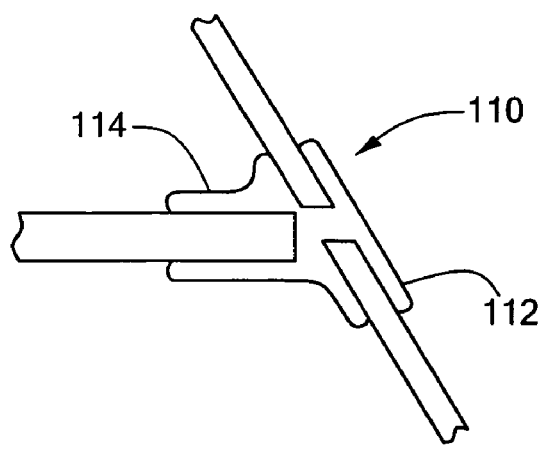
FIG. 8 is a further embodiment of the joint assembly of FIG. 7.
Figure 9:
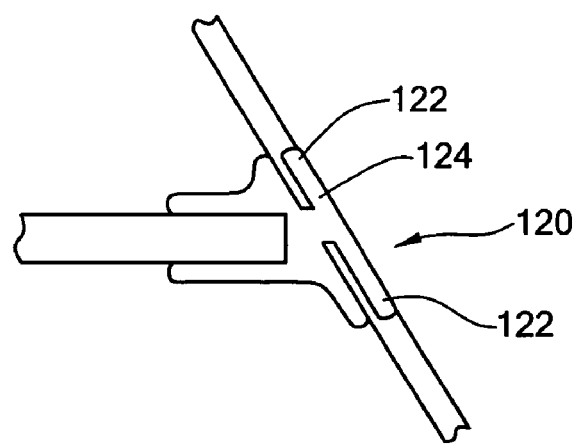
FIG. 9 is a still further embodiment of the joint assembly of FIG. 7.
Figure 10:
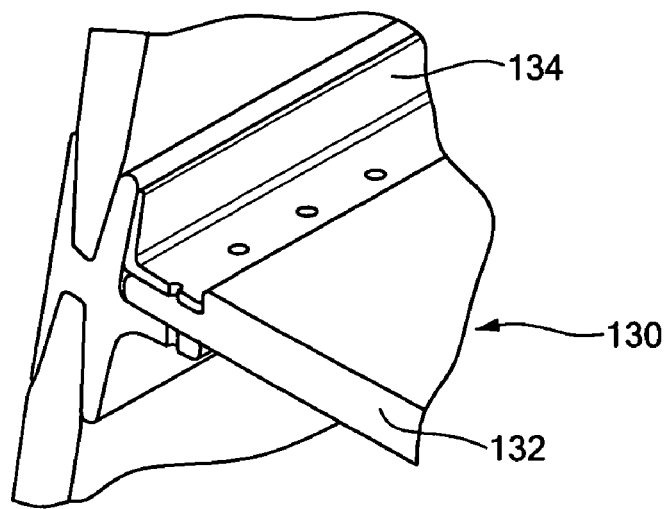
FIG. 10 is a still further embodiment of the joint assembly of FIG. 7.

FIG. 8 illustrates a joint assembly 110 in which the lineal piece 112 is disposed at other than a right angle with respect to the flange 114, which is suitable for use with perimeter walls angled from vertical, as shown above in FIG. 1. FIG. 9 illustrates a joint assembly 120 in which the colinear panels have been recessed along their long edges 122 so that the lineal piece 124 of the joint assembly lies flush with the outer surface of the panels. FIG. 10 illustrates a joint assembly 130 in which the deck panel 132 has been recessed to receive the angle member 134.

Figure 11:
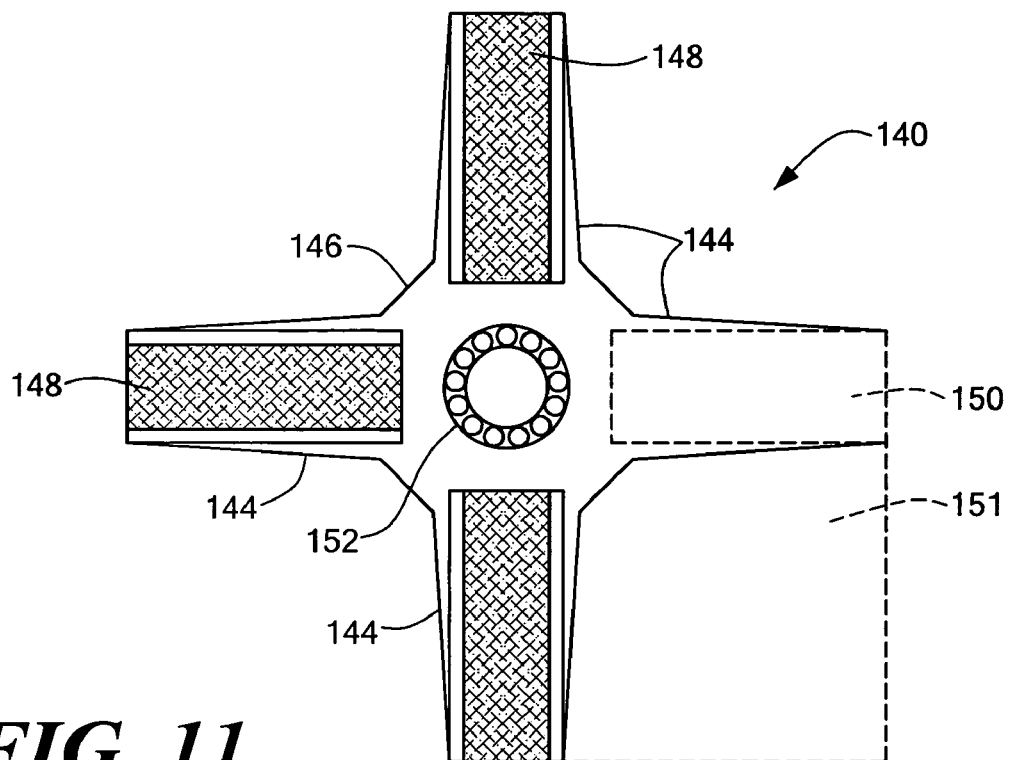
FIG. 11 is a schematic cross sectional view of a four-corner joint assembly according to the present invention.
Figure 12:
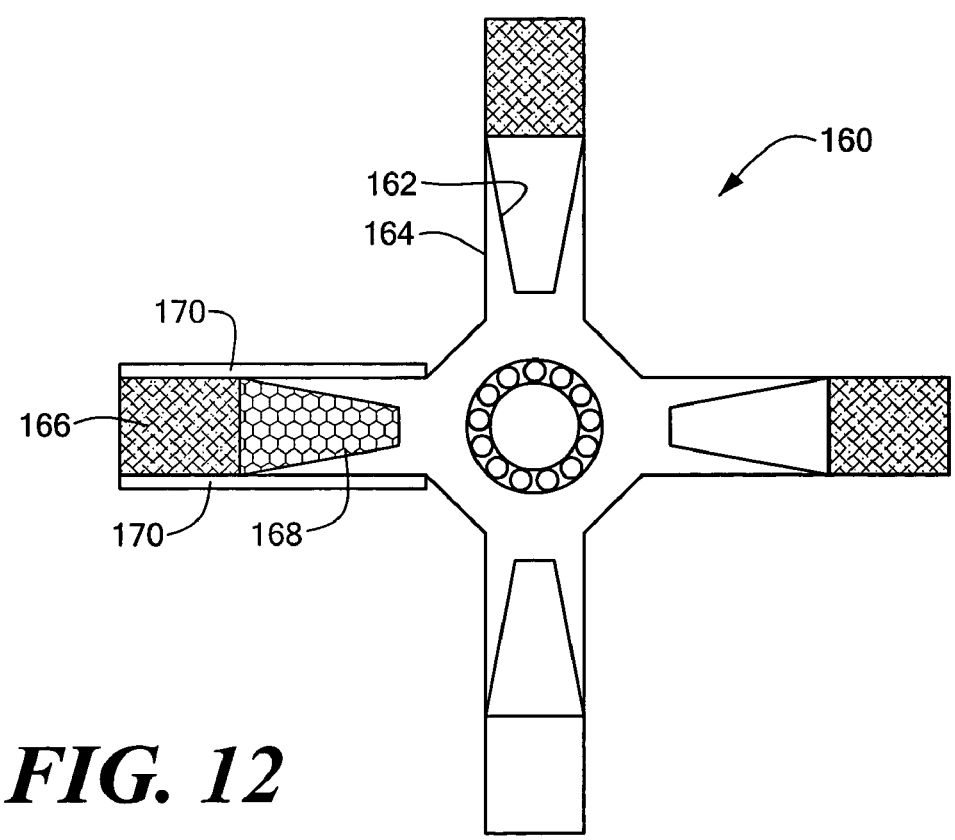
FIG. 12 is a further embodiment of the joint assembly of FIG. 11.
Figure 13:
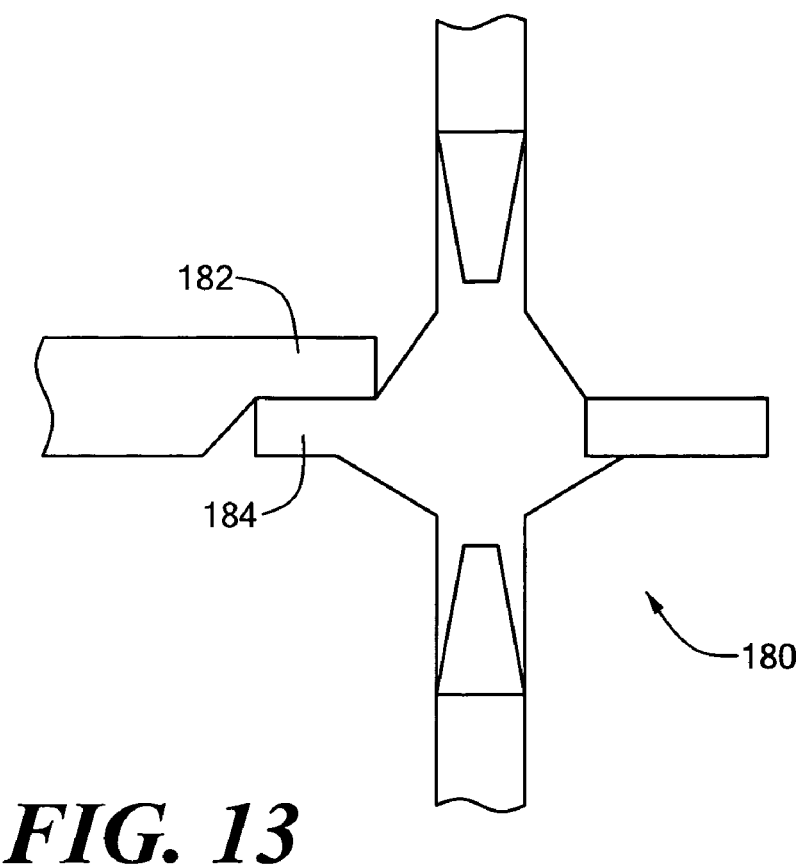
FIG. 13 is a still further embodiment of the joint assembly of FIG. 11.
Figure 14:
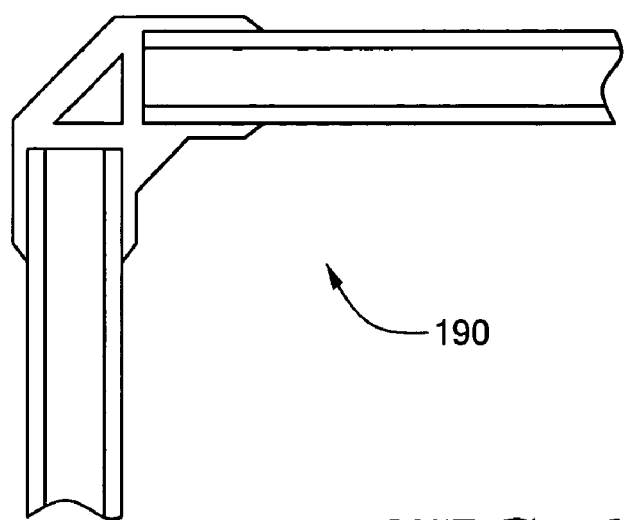
FIG. 14 is a schematic view of a two-corner joint assembly according to the present invention.

A joint assembly 140 for joining four panels at right angles is illustrated in FIG. 11. This joint assembly is suitable, for example, as an internal bulkhead corner joint. This joint assembly includes four flanges 144 extending from a central hub 146. Each flange has a recess for receiving a panel structure 148. The joint assembly can be suitably formed by pultrusion using suitable insert dies 150, 151 (shown in phantom) to form the recesses and each corner. A number of rods 152 can be placed in the central hub for strengthening in the joint assembly. FIG. 12 illustrates a joint assembly 160 in which the recesses 162 in the flanges 164 are tapered to receive panels 166 having tapered cores 168 that fit into the recesses and face sheets 170 that extend over the flanges of the joint assembly. FIG. 13 illustrates a joint assembly 180 in which the panel edges 182 can be recessed and the flanges 184 can be configured to lap the recessed edge. As will be apparent, a combination of flange designs can be used. Additionally, less than four flanges may be provided if desired. For example, FIG. 14 illustrates a joint assembly 190 having two flanges for joining two panels at a corner.

Figure 15:
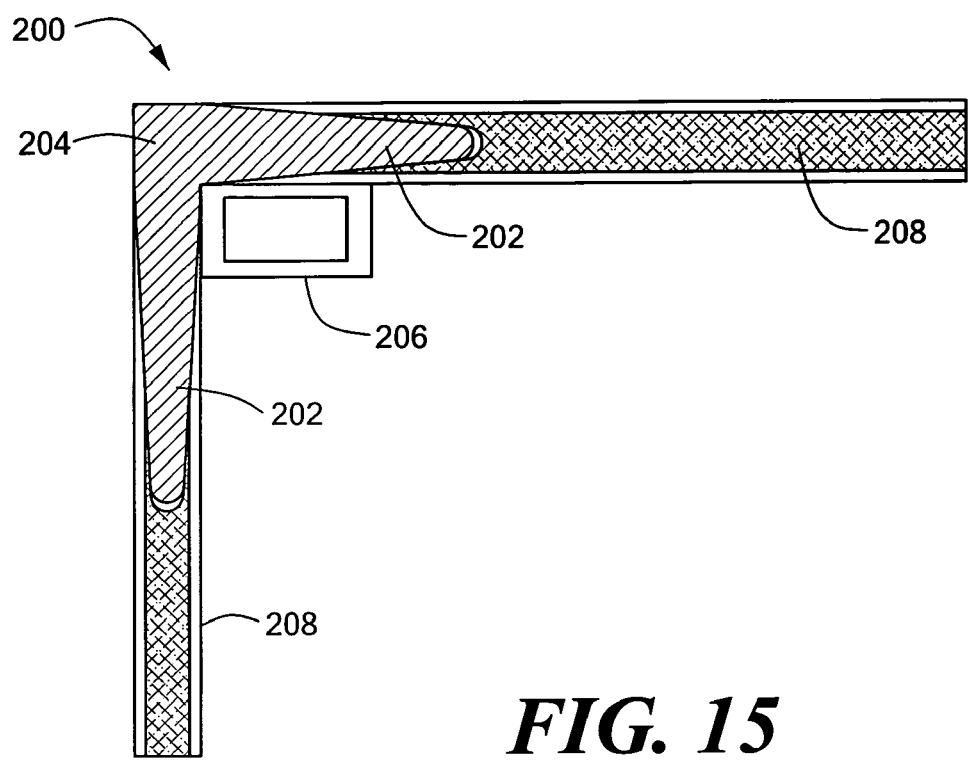
FIG. 15 is a schematic cross sectional view of a two-corner joint assembly according to the present invention.
Figure 16:
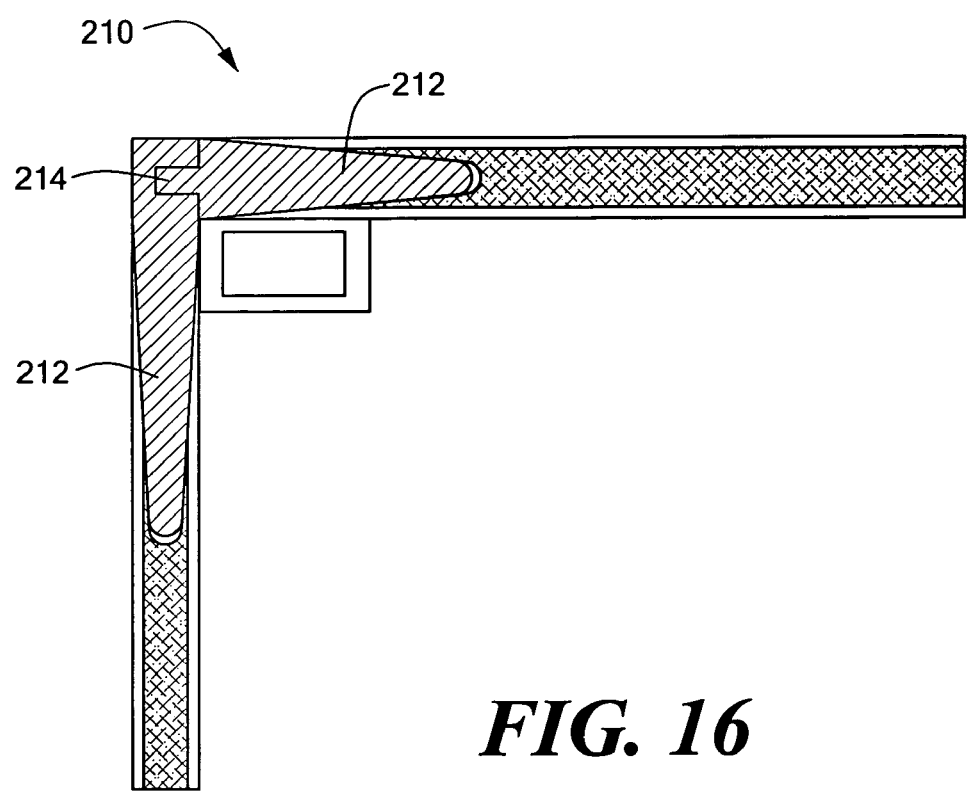
FIG. 16 is a further embodiment of the joint assembly of FIG. 15.

A further joint assembly 200 for joining two panels at a corner is illustrated in FIG. 15. This joint assembly includes two flanges 202 integrally joined to form a corner 204 of any desired angle, such as a right angle as shown, and a beam member 206 configured to fit against the panel members 208 within the corner. Although a right angle joint is illustrated, it will be appreciated that any desired angle can be provided. In this embodiment, the flanges are tapered, and the panel edges are recessed to fit over the tapered flanges. The recessed edges may be formed during the pultrusion process, or recesses may be machined into the edges subsequently. The panels and the joint assembly are fastened in any suitable manner, such as described above. In an alternative embodiment of a joint assembly 210 illustrated in FIG. 16, the flanges 212 can be formed separately and fastened together, such as with a mortise and tenon joint 214.

Figure 17:
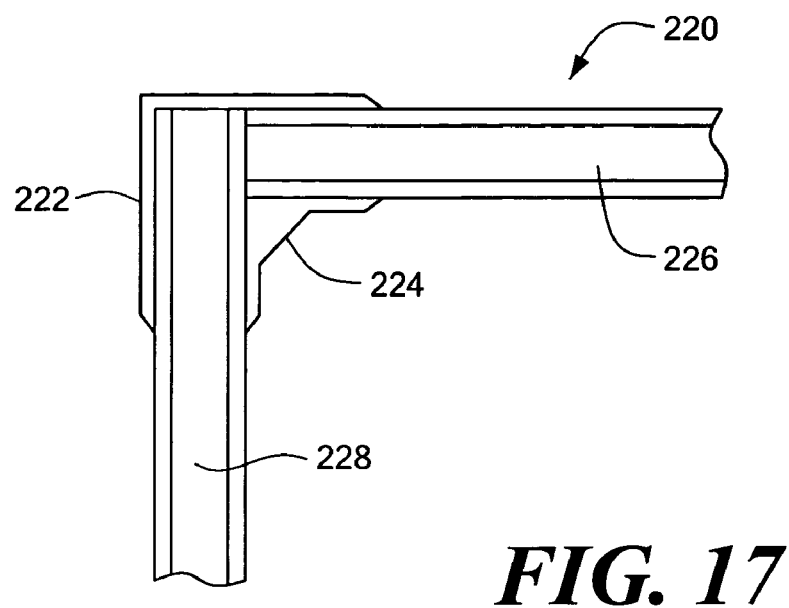
FIG. 17 is a further embodiment of a two-corner joint assembly of the present invention.

A further corner joint assembly 220 is illustrated in FIG. 17. This joint assembly includes an outer corner member 222 and an inner corner member 224. The outer corner member is fastened to the outer corner formed by two panels 226, 228 butted together. The inner corner member is fastened to the inner corner formed by the two panels. The inner corner member may include additional reinforcing material for strengthening if desired.

Figure 18:
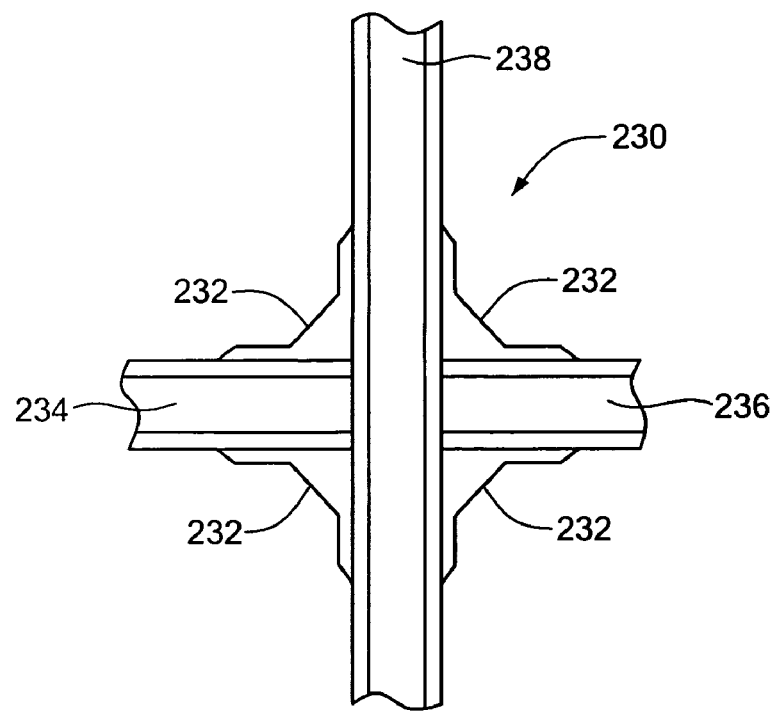
FIG. 18 is a further embodiment of a four-corner joint assembly of the present invention.

FIG. 18 illustrates a joint assembly 230 in which four inner corner members 232 are arranged to fasten three panels together to form four corners. Two panels 234, 236 are butted against a third panel 238 along an interior portion thereof.

Figure 25:
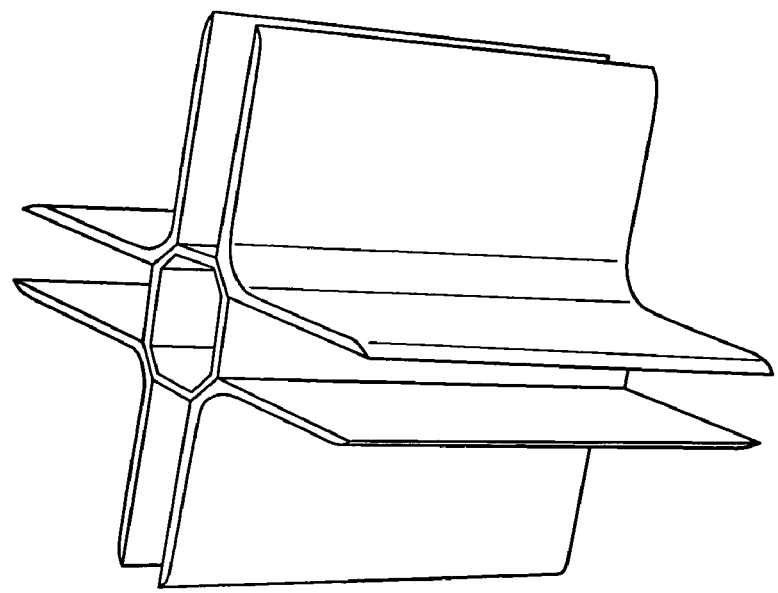
Figure 24:
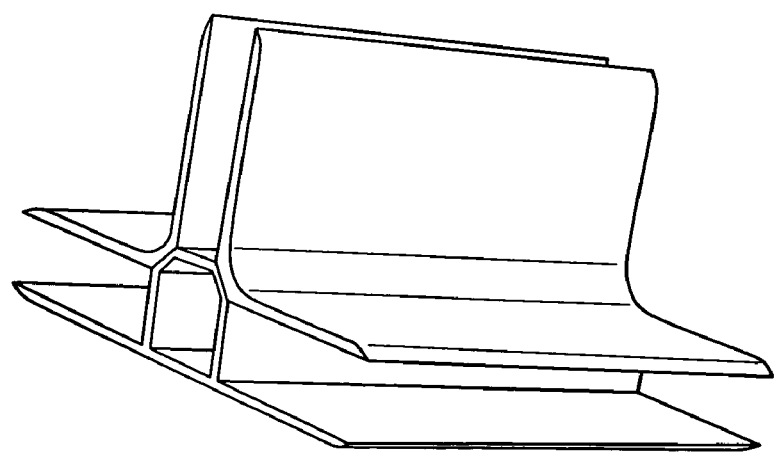
Figure 23:
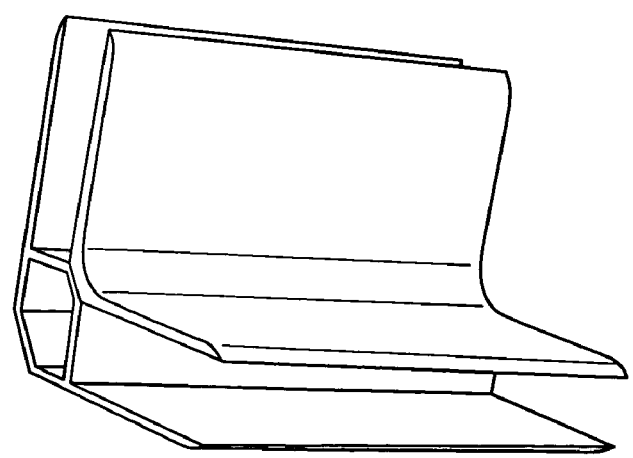

Still further embodiments of joint assemblies are illustrated in FIGS. 19-25. FIG. 23 illustrates a joint assembly that is formed from the parts illustrated in FIGS. 19 and 20. FIG. 24 illustrates a joint assembly that is formed from the parts illustrated in FIGS. 20 and 21. FIG. 25 illustrates a joint assembly that is formed from the parts illustrated in FIGS. 20 and 22. Thus, in these cases, a common right angle part is used to close each joint. It will be appreciated that other joint configurations are possible, and the particular joint configuration will be selected based on the configuration and strength requirements of the structure.

Figure 26:
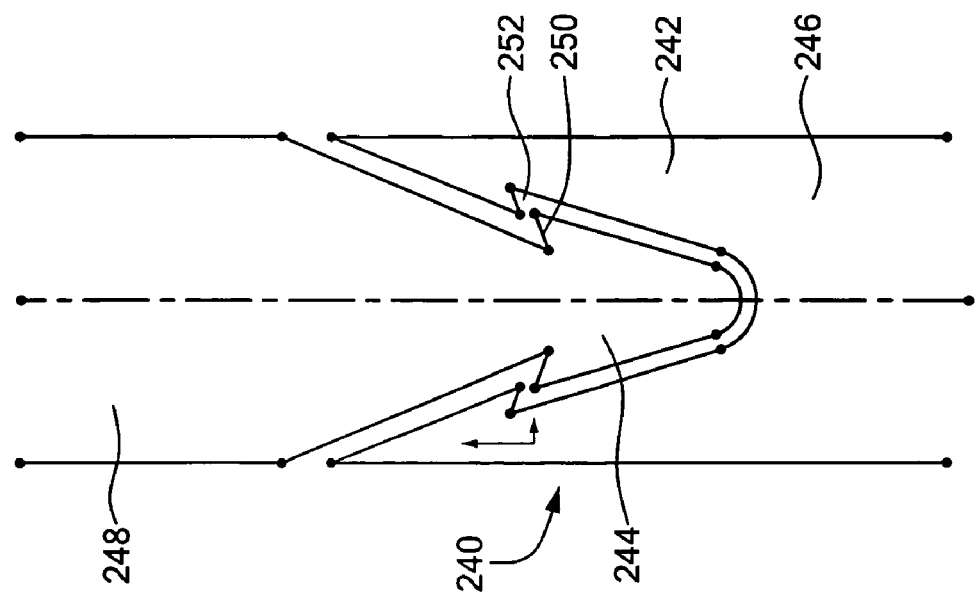
FIG. 26 is a schematic view of an interlocking joint assembly integrated into panel edges.

FIG. 26 illustrates an embodiment of a joint assembly 240 in which the joint details are integrally formed into the longitudinal edges 242, 244 of the panels 246, 248 during pultrusion. One edge 244 includes a male portion and the opposite edge 242 includes a female portion. A tab 250 and mating recess 252 are also included to provide interlocking of the two portions.

Figure 27:
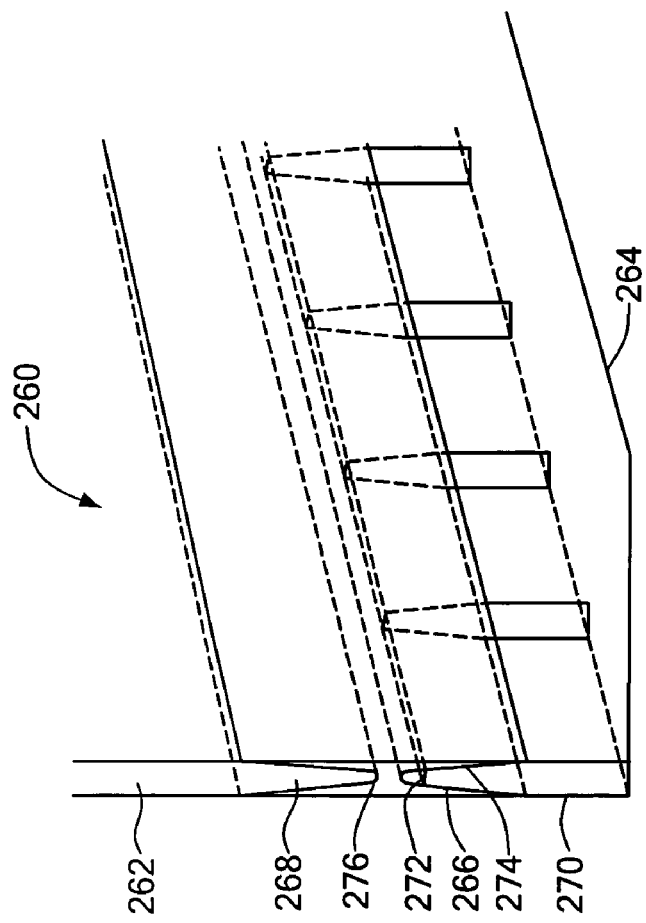
FIG. 27 is a schematic view of a joint assembly for a composite panel to a steel deck.

A joint assembly 260 that is particularly suitable for joining a composite panel 262 to a steel deck 264 is illustrated in FIG. 27. This joint assembly includes two recesses 266, 268 extending in a direction of elongation. The recesses are preferably tapered. A steel coaming structure 270 is welded, brazed, riveted, or attached in any other suitable manner to the steel deck 264. If the steel deck is curved, the lower edge of the steel coaming structure can be curved to mate with the steel deck. The upper edge 272 of the coaming structure is straight and tapered to form a wedge 274 that fits within the correspondingly tapered lower recess 266 of the joint assembly. A lower edge 276 of a composite panel fits within the upper recess. In this way, a composite panel having a straight lower edge can be fitted to a curved or irregular steel deck. The coaming structure extends a sufficient distance above the deck so that it may be readily inspected and so that debris or moisture cannot collect. In an alternative, the lower edge of the composite panel can be formed with a lower recess to receive the upper edge of the coaming structure.

Figure 28:
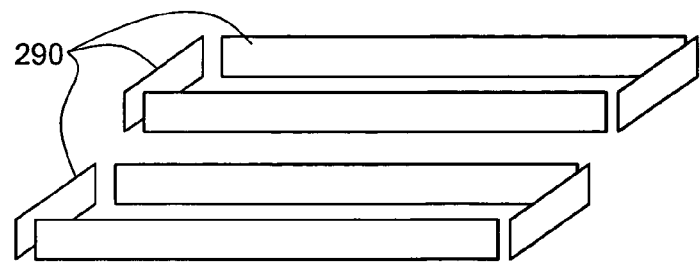
FIG. 28 is a schematic illustration of a further assembly process according to the present invention.
Figure 29:
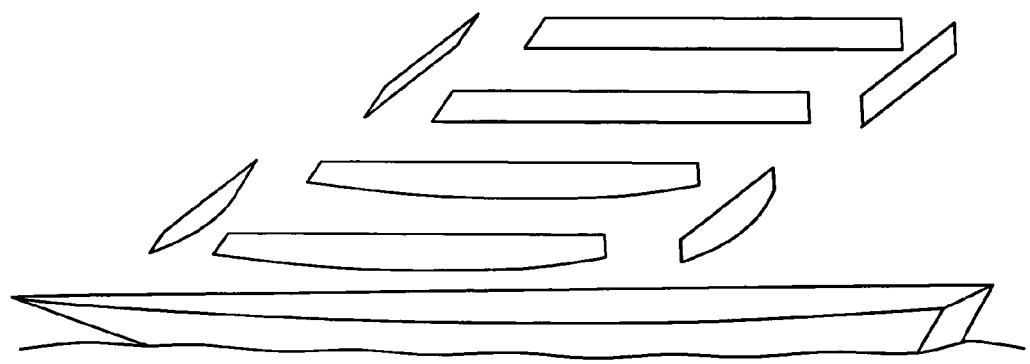
FIG. 29 is a schematic illustration of a further step of the assembly process of FIG. 28.
Figure 30:
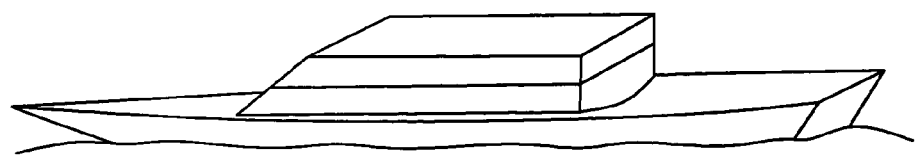
FIG. 30 is a schematic illustration of a still further step of the assembly process of FIGS. 28 and 29.

Another method for accommodating the complex curvatures of a foundational surface such as a ship's deck is illustrated in FIGS. 28-30. A panel is continuously pultruded with a constant cross section. The pultruded panel is cut into sections 290 having the desired lengths for the structure. Each panel is trimmed to mate the edge to the existing curvature, as illustrated in FIG. 29. The joints between the structure and the foundational surface can be formed using a vacuum assisted resin transfer method. In this case, panels are fixed into position (see FIG. 30), fabric materials to form the joint are positioned in the joint area, the joint area is bagged, and resin is infused along the joint length. This results in a joint that is able to accommodate any local irregularities.

The joint assemblies of the present invention can also be fabricated to provide good electromagnetic interference (EMI) shielding. The panels and the joint assembly can be pultruded with their outermost ply or plies including conductive fibrous or metallic layers and/or conductivity-enhancing particulate fillers. Referring, for example, to FIG. 7, by tapering the recesses in the lineal piece, the joint assembly's outermost plies can extend beyond the joint edge, thereby covering the seam between the joint assembly and the panels. Suitable conductivity-enhancing layered materials include, for example, fabrics and felts made with electrically conductive metal fiber, solid or perforated thin metal foils, and fabric and felts made with metal-coated glass or carbon fiber. Layers of conductive fiber or felt can also provide some mechanical strength and stiffness.

Conductivity-enhancing particulate fillers include, for example, carbon black and various forms of particulate graphite, metal coated particles or metal flakes, or carbon nanotubes and nanofibers. The fillers contribute to overall EMI shielding effectiveness by virtue of the inherent electrical conductivity, and by providing additional conductive paths between the reinforcing fabrics, felts or perforated sheets. Carbon nanotubes and nanofibers can provide electrical conductivity enhancement at relatively low particulate loadings. Carbon black is an excellent UV inhibitor and produces a gray color, reducing the need for painting.

Locating the EMI shielding layer as the outermost ply reduces the risk associated with delamination of the laminate due to lightning strikes. Metallic fabric or felt surfaces also provide a continuous membrane for EMI shielding and good surface area at joints for grounding composite structures to steel hull structures. Also, repeated cyclic loading can lead to the development of microcracks, which create discontinuities in the EMI shield, leading to leaks. Metallic fabrics or felts can provide additional grounding paths across areas of microcracking.

It will be appreciated that the present invention is applicable to a variety of large-scale structures in addition to buildings and ships, such as rail cars, building facades, tunnel liners, bridges, or piers. At least a portion of a ship's hull can be formed according to the invention. The invention is not to be limited by what has been particularly shown and described, except as indicated by the appended claims.

What is claimed is:

1. A process for fabricating a large, multi-level composite shipboard structure, comprising:

pultruding a continuous panel in a process direction in a pultrusion die assembly, the continuous panel having opposed longitudinal edges extending in the process direction, each longitudinal edge having an edge profile extending continuously in the process direction, one edge profile comprising a tapered male portion, an opposite edge profile comprising a complementary tapered female portion, the continuous panel having a width transverse to the process direction;

after the panel exits the pultrusion die assembly, cutting the continuous panel across the process direction into panel sections of desired lengths, the panel sections including at least a first panel section and a second panel section each having a length of at least twenty feet in the process direction; and assembling the panel sections into a shipboard structure attached to a deck of a ship, comprising:

attaching a frame to a surface of the deck along at least a portion of an outline of the perimeter of the structure, the frame including at least a first horizontally extending straight line segment having a length of at least twenty feet;

attaching the first panel section to the frame at the first horizontally extending straight line segment, with the process direction extending horizontally and the width extending in an upward direction from the deck of the ship, attaching the second panel section to the first panel section to lie in the same plane, with an in-plane joint assembly along adjacent longitudinal edges of the first and second panel sections, and attaching at least a third panel section to the first and second panel sections at the in-plane joint assembly with an out-of-plane joint assembly, with the third panel section lying in a different plane to form a horizontal deck separating the structure into multiple levels, wherein a first level is formed between the deck of the ship and the horizontal deck, the first level coextensive with the width of the first panel section.

2. The process of claim 1, wherein the edge profiles of the opposed longitudinal edges are further pultruded with complementary interlocking features to form the joint when the two panel sections are joined along adjacent longitudinal edges.

3. The process of claim 1, wherein the longitudinal edges are further attached by mechanically fastening, adhesive bonding, or by a combination of adhesive bonding and mechanical fastening.

4. The process of claim 1, wherein the in-plane joint assembly is formed by pultruding in the process direction.

5. The process of claim 4, wherein the edge profiles of the opposed longitudinal edges are machined to mate with the in-plane joint assembly.

6. The process of claim 4, wherein the edge profile of at least one longitudinal edge is tapered to mate with the in-plane joint assembly.

7. The process of claim 4, wherein the continuous panel is pultruded with at least one tapered edge profile to mate with the in-plane joint assembly.

8. The process of claim 1, wherein the in-plane joint assembly between the first and second panel sections comprises a composite material.

9. The process of claim 8, further comprising molding the in-plane composite material joint assembly.

10. The process of claim 1, further comprising molding the in-plane joint assembly.

11. The process of claim 1, further comprising providing a gasket between the first and second panel sections.

12. The process of claim 1, further comprising providing caulk between the first and second panel sections.

13. The process of claim 1, wherein a joint between the first and second panel sections is flush with surfaces of the first and second panel sections.

14. The process of claim 1, wherein a joint between the first and second panel sections is flush with outer surfaces of the first and second panel sections.

15. The process of claim 1, wherein the process direction of the third panel section is parallel to the process direction of the first and second panel sections.

16. The process of claim 1, wherein the continuous panel has a width transverse to the process direction greater than four feet.

17. The process of claim 1, wherein the continuous panel has a width transverse to the process direction greater than eight feet.

18. The process of claim 1, wherein the first and second panel sections are at least forty feet long.

19. The process of claim 1, wherein the first and second panel sections are at least one hundred feet long.

20. The process of claim 1, wherein the first and second panel sections are at least twice as long as wide.

21. The process of claim 1, further comprising pultruding the continuous panel and assembling the structure at a same location.

* * * * *